United States Patent Office

2,957,786
Patented Oct. 25, 1960

2,957,786

PROCESS FOR CURING BUTADIENE-STYRENE COPOLYMER DRYING OILS AND THEIR BLOWN DERIVATIVES

Earl E. Baumhart, Berea, and Myron W. Kiebler, Jr., Cleveland, Ohio, and Albert Zier, Chicago, Ill., assignors to The Glidden Company, Cleveland, Ohio, a corporation of Ohio No Drawing. Filed Aug. 28, 1953, Ser. No. 377,242

13 Claims. (Cl. 117—161)

This invention relates to the novel catalytic treatment of butadiene-styrene drying oils to improve the cure of such oils and/or to lower the curing temperatures thereof.

Copolymer drying oils composed of 75%–85% of combined butadiene-1,3 and 25%–15% of combined styrene, modified or not with .05–.5% combined maleic anhydride, and processes for preparing such hydrocarbon copolymer drying oils by means of sodium as a polymerization catalyst are described and claimed in the copending applications Serial Nos. 102,703 and 176,771 filed July 1, 1949 and July 29, 1950 now U.S. Patents 2,652,342 and 2,762,851, respectively. The earlier application discloses and claims the curing of such drying oils by the incorporation thereinto of from .05%–1% of at least one drier selected from the group consisting of lead, cobalt and manganese naphthenate.

We have now discovered that improved curing and/or lower curing temperatures can be secured by using organic peroxides and/or certain other organic compounds as curing catalysts.

Accordingly, one object of this invention is to provide novel processes for curing butadiene-styrene copolymer drying oils of the types described hereinabove as well as their blown derivatives, by incorporating in such drying oils (or in coating compositions containing them) small effective amounts of peroxide or certain other curing catalysts identified below.

Another object is to provide blown derivatives of butadiene-styrene copolymer oils which are also responsive to the said curing catalysts identified below.

These objects and others will be apparent from the following description of the invention.

Copolymer hydrocarbon drying oils prepared from butadiene and styrene in the proportions described above and by the processes described in the aforementioned applications have numerous properties which make them especially useful as the vehicle of varnishes, enamels and other coating compositions. For example, the cured films possess good chemical resistance, good mechanical properties such as toughness, flexibility, etc. and good resistance to thermal decomposition. However, they presently require long curing times at temperatures which are higher than are customarily used in the baking ovens of commercial finishing plants. Moreover, while the hydrocarbon drying oils are themselves of light color originally, when films thereof are cured by baking in the presence of lead, cobalt and/or manganese naphthenate driers, the cured films are darkened so much that the oils cannot be used generally for white or light-colored coatings.

We have now found that these drying oils as well as their blown derivatives and coatings containing them can be cured more thoroughly than heretofore and with appreciably less darkening and loss of gloss by incorporating one or more of the catalysts listed below (in small effective amounts up to about 2% by weight on the drying oil solids) and then baking the catalyzed products at appreciably lower temperatures than used heretofore, and/or by baking them for shorter time periods at the same temperatures used heretofore. The catalysts which yield the foregoing benefits and advantages are:

Organic peroxides as a class; benzoyl peroxide esp. preferred
Ferric tris 2,4-pentanedionate
Chromium pentanedionate
$\alpha,\alpha'$-dipyridyl orthophenanthroline The following examples illustrate the merits of the foregoing catalysts. In these examples the benefits of the catalysts were investigated in relation to an enamel coating, so that any effects of the catalyst on gloss could be evaluated along with other conferred benefits, such as film hardness, film color, etc. The enamel was formulated as follows:

Sodium copolymer hydrocarbon oil as prepared according to application Ser. No. 102,703, and composed of about 75 parts combined butadiene, 25 parts combined styrene and 0.5 part combined maleic anhydride; 50% N.V.M.; viscosity W+ (Gardner-Holdt) _____gallon__ 1
Non-chalking Rutile TiO$_2$ pigment _____pounds__ 3
Mineral spirits _____gallon__ ½

These ingredients were ground together in a paint mill until an enamel grind had been secured. 20 gram portions of the resulting enamel were used in each test in combination with 0.2 gram of the drier indicated in the following table. Each of the resulting test portions of catalyzed enamel was then applied to metal panels in films 5 mils and 3 mils thick, after which the coated panels were baked for 20 minutes at 300° F. In the case of the benzoyl peroxide which is a solid, this catalyst was incorporated into the test enamel in the form of a saturated solution of the catalyst in toluene.

Table 1

HARDNESS OF BAKED FILM

| Example | Catalyst | 5 mil. | 3 mil. | Remarks |
| --- | --- | --- | --- | --- |
| 1 | Benzoyl peroxide | Hard | Hard | Very slight yellowing, very slight loss of gloss, softer than Ex. 2. |
| 2 | Ferric tris 2,4-pentanedionate. | do | do | Hardest film of all, low gloss, reddish cast. |
| 3 | $\alpha,\alpha'$-dipyridyl orthophenanthroline. | do | do | Yellow film, slight loss of gloss, softer than Example 1. |
| 4 | Chromium Pentanedionate. | do | do | Slight discoloration; slight loss of gloss, softer than Example 3. |
| 5 | Lead, cobalt, manganese, naphthenates (Mixed Drier). | do | do | Yellows film, poor gloss, softer than Example 2. |
| 6 | Manganese naphthenate. | do | do | Do. |
| 7 | Cobalt naphthenate. | do | do | Do. |
| 8 | Lead naphthenate | Tacky | Tacky | Do. |

The relative ratings of the effective catalysts are shown in the following table, in which the numeral one represents the highest rating and progressively higher numbers represent progressively inferior ratings.

Table 2

| Drier | Hardness | Color | Gloss |
| --- | --- | --- | --- |
| Ferric tris 2,4,pentanedionate | 1 | 5 | 3 |
| Mixed Pb, Co, Mn Drier of Ex. 5 | 2 | 4 | 4 |
| Mn naphthenate (Ex. 6) | 2 | 4 | 4 |
| Benzoyl peroxide | 3 | 1 | 1 |
| $\alpha,\alpha'$-dipyridyl orthophenanthroline | 4 | 3 | 2 |
| Chromium pentanedionate | 5 | 2 | 1 |

Samples of the enamels containing 0.2 gram of catalyst per 20 grams of enamel were stored in half-filled jars to observe their stability on storage. The results obtained after 140 days storage at ambient room temperatures are shown in Table 3.

Table 3

| Catalyst | Condition of Enamel |
| --- | --- |
| Ferric tris 2,4,pentanedionate | Soft gel. |
| Mixed Pb, Co, Mn, drier of Ex. 5 | Semigel. |
| Mn naphthenate | Very heavy. |
| Benzoyl peroxide | Heavy. |
| α,α′ dipyridyl orthophenanthroline | Heavy. |
| Chromium pentanedionate | Unchanged. |

It will be observed that in storage the catalysts cause bodying of the enamel in about the same order as they affect the hardness of baked films. For example, chromium pentanedionate induces the lowest hardness in baked films and also causes the least bodying of the liquid enamel on storage. It should be recognized that while the more active catalysts impart poor stability tests at 140 days, still the catalysts are highly useful where such prolonged storage of the coating composition is not apt to be encountered, as in various industrial finishes which are consumed rather promptly after being received from the coating supplier.

From the foregoing examples, it will be clear that where hardness of film is of paramount importance, the ferric tris 2,4, pentanedionate is a drier of outstanding merit. Where color and gloss are of paramount importance, benzoyl peroxide is best and pentanedionate is next best. In coatings where stability is of considerable importance, chromium pentanedionate also has further merit. These three catalysts accordingly provide a coating formulator with a choice of properties which permit the catalyst to be adapted to the particular use for which the formulation is intended, and in every case to give at least one advantage either in hardness, color, gloss retention or stability over the naphthenate driers proposed in the copending application Ser. No. 102,703, supra.

We especially prefer benzoyl peroxide over other peroxides since it is a solid material at room temperatures and has low volatility. Other active peroxide catalysts which we have investigated are liquids and volatile; hence their use could lead to loss of catalyst as a result of evaporation before the catalyst(s) would have an opportunity to convert the film. Moreover, benzoyl peroxide presently is moderately low in cost and is readily available, whereas the liquid peroxides are more costly, less readily available generally, and as noted, may lead to loss through evaporation.

Of the numerous liquid peroxides which we have investigated, the following gave especially useful results when used individually in the foregoing enamel formulation at a level of 1% on drying oil solids; methyl ethyl ketone hydroperoxide, t-butyl hydroperoxide, cumene hydroperoxide, di-t-butyl hydroperoxide, diisopropyl benzene hydroperoxide and hydroxyheptyl peroxide.

The advantages of our catalysts in lowering the baking temperature while improving the character of the cured films is shown in the following table where baked films of a conventional alkyd black enamel over a hydrocarbon copolymer sanding primer were tested with and without a curing catalyst. The sanding primer was formulated as follows:

| | Parts by weight |
| --- | --- |
| Red iron oxide | 36 |
| Calcium carbonate | 9 |
| Silicate inerts | 55 |
| Hydrocarbon copolymer drying oil solids * | 62½ |
| Vm & P naphtha | 37 |
| Benzoyl peroxide | ½ |

* Same as in white enamel of Examples 1–8, supra.

Benzoyl peroxide can be used in amounts from 0.5% to 1.0% based on drying oil solids.

Table 4

TEST ON SANDING PRIMER FILM ALONE

| Baking Treatment | No Catalyst | Benzoyl Peroxide Catalyst |
| --- | --- | --- |
| ½ hr. at 250° F | film not dry | film firm and tack free. |
| 1 hr. at 250° F | film firm | film hard. |
| ½ hr. at 300° F | film tacky | Do. |
| 1 hr. at 300° F | film hard | Do. |

TESTS WITH BLACK TOPCOAT OVER SANDING PRIMER

| Baking Treatment | No Catalyst | Benzoyl Peroxide Catalyst |
| --- | --- | --- |
| | Salt Spray Resistance | |
| 1 hr. at 250° F | Poor | Good. |
| | Humidity (100% Humidity at 100° F.) | |
| 1 hr. at 250° F | Poor | Very good. |
| | Water Soak (Room Temperature) | |
| 1 hr. at 250° F | Poor | Very good. |

Peroxide catalysts and the other catalysts identified above are also effective in curing the hydrocarbon copolymer drying oils which have been blown with air or oxygen until organic peroxides have been formed in situ. For example, samples of the oils were taken after 0, 2, 4 and 8 hours of air blowing at 220° F., and films thereof were baked twenty minutes at 300° F. with and without 1% of added benzoyl peroxide catalyst. While the hardness of the uncatalyzed baked films increased progressively with extent of blowing, the presence of the catalyst gave much harder films even after 8 hours of blowing. The hydrocarbon copolymer drying oil so blown can be modified or not with maleic anhydride.

The catalyst(s) of our invention can be incorporated in the hydrocarbon drying oils in various ways, as by dissolving the catalyst in the oil itself, by adding organic solvent solutions of the catalyst(s) to the oil or coating composition, or by grinding solid catalyst(s) such as benzoyl peroxide into the oil or into the coating composition containing the oil. The essential point is to obtain a good dissemination of the catalyst through the film which is to be cured, and molecular dispersion such as is secured by dissolving the catalyst in the oil itself is not essential. Of course, the amount of catalyst needed for effective curing tends to increase when inferior dissemination is secured, smallest amounts being needed when true molecular dispersion is obtained.

It will be understood that our discovery of the curing catalysts described hereinabove greatly expands the fields of usefulness of the hydrocarbon copolymer drying oils, since the improved qualities of the cured films, whether pigmented or clear, render the films more widely useful as protective and decorative coatings, while yet making it possible to bake the films at lower temperatures and/or for shorter times than were heretofore possible. Moreover, the lower temperatures afforded by the presence of our catalysts make it possible to bake the catalyzed coatings in commercial bake ovens, thus bringing the drying oil and coatings containing it into the realm of conventional practice.

It should be understood that the qualities of the thoroughly cured hydrocarbon drying oil permit films thereof to be applied as sanitary coatings on various food containers (e.g., beer cans) as protective coatings for corrodible metals such as iron, aluminum, zinc, copper, etc. and as protective and/or decorative coatings on any base material which is not harmed by the baking temperatures.

The drying oils, when catalyzed and baked, need not be only in the form of films, since thick sections can be cured equally well. Hence the oils can be used as or in potting compounds and similar embedding compositions. For most uses we presently prefer to practice our inventions in connection with the hydrocarbon drying oil copolymers which have been modified with small amounts of combined maleic anhydride.

Having now described our invention, what we claim is:

1. The method of curing a film forming composition in which the film-forming material consists essentially of material selected from the group consisting of: (a) hydrocarbon copolymer drying oil prepared by the sodium polymerization of butadiene-1,3 and styrene to yield a composition composed essentially of 75–85% combined butadiene-1,3 and 25–15% of combined styrene; (b) hydrocarbon copolymer drying oils as in (a) modified with small amounts of combined maleic anhydride; (c) copolymer drying oil as in (a) which has been blown in liquid condition with a stream of oxygen-containing gas passed therethrough at least until a baked film thereof exhibits greater hardness than that of a similarly baked film of the same oil which has not been blown; (d) copolymer drying oil as in (b) which has been blown in liquid condition with a stream of oxygen-containing gas passed therethrough at least until a baked film thereof exhibits greater hardness than that of a similarly baked film of the same oil which has not been blown; said process comprising the steps of: incorporating in said coating composition, as the sole curing catalyst therein, an effective amount up to about 2% by weight on the drying oil solids of at least one curing catalyst selected from the group consisting of organic peroxides in amounts between about 0.5% and 2% and ferric tris 2,4-pentanedionate, chromium pentanedionate and $\alpha,\alpha'$ dipyridyl orthophenanthroline in small amounts up to 2%; and thereafter baking a film of said coating composition at temperatures between about 250° F. and 300° F. until said film has been cured.

2. The method as claimed in claim 1 wherein the catalyst is composed of organic peroxide.

3. The method as claimed in claim 2 wherein the catalyst is benzoyl peroxide in amounts between about 0.5% and 1%.

4. The method as claimed in claim 1 wherein the said film-forming material consists essentially of said blown hydrocarbon copolymer drying oil as defined in (d) of claim 1.

5. The method as claimed in claim 4 wherein the catalyst consists of organic peroxide.

6. The method as claimed in claim 5 wherein the catalyst is benzoyl peroxide in amounts between about 0.5% and 1%.

7. The method as claimed in claim 1 wherein said film-forming material consists essentially of said blown hydrocarbon copolymer drying oil as defined in (c) of claim 1.

8. The method as claimed in claim 7 wherein the catalyst consists of organic peroxide.

9. The method as claimed in claim 8 wherein the catalyst is benzoyl peroxide in amounts between about 0.5% and 1%.

10. The method as claimed in claim 1 wherein the said film-forming material consists essentially of said hydrocarbon copolymer drying oil as defined in (b) of claim 1.

11. The method as claimed in claim 10 wherein the catalyst consists of organic peroxide.

12. The method as claimed in claim 11 wherein the catalyst is benzoyl peroxide in amounts between about 0.5% and 1%.

13. As an article of manufacture, a heat-resistant substrate coated with a film which has been prepared and cured in accordance with the method defined in claim 1.

References Cited in the file of this patent

UNITED STATES PATENTS

| | | |
|---|---|---|
| 2,131,195 | Schneider et al. | Sept. 27, 1938 |
| 2,556,335 | Moser | June 12, 1951 |
| 2,578,214 | West | Dec. 11, 1951 |
| 2,652,342 | Gleason | Sept. 15, 1953 |
| 2,669,526 | Koenecke | Feb. 16, 1954 |
| 2,674,586 | Welch | Apr. 6, 1954 |
| 2,684,305 | Guinlivan | July 20, 1954 |
| 2,701,780 | Nelson et al. | Feb. 8, 1955 |
| 2,708,639 | Miller | May 17, 1955 |
| 2,762,851 | Gleason | Sept. 11, 1956 |

FOREIGN PATENTS

| | | |
|---|---|---|
| 571,867 | Great Britain | Sept. 12, 1945 |

OTHER REFERENCES

Mattiello: "Protective and Decorative Coatings," vol. I (1941), pages 67, 68 and 158.